United States Patent
Busick et al.

[11] Patent Number: 5,927,557
[45] Date of Patent: Jul. 27, 1999

[54] RESERVOIR AND FAUCET ASSEMBLY FOR A WATER COOLER

[76] Inventors: Louis M. Busick, 2769 Minerva Lake Rd., Columbus, Ohio 43231; Brian R. Fortner, 578 Woodmark Rd., Gahanna, Ohio 43230; Michael T. Kopczewski, 11498 Darby Creek Rd., Orient, Ohio 43146

[21] Appl. No.: 09/008,239

[22] Filed: Jan. 16, 1998

[51] Int. Cl.⁶ ........................................................ B65B 1/04
[52] U.S. Cl. .................. 222/185.1; 222/554; 137/329.1; 62/389
[58] Field of Search .............................. 222/185.1, 146.6, 222/146.1, 501, 554; 137/329.1, 329.2, 329.3, 329.4; 62/389, 390, 395

[56] References Cited

U.S. PATENT DOCUMENTS

| | | |
|---|---|---|
| 108,824 | 11/1870 | Putnam . |
| 189,191 | 4/1877 | Collier . |
| 244,320 | 7/1881 | Schofield . |
| 405,135 | 6/1889 | Walton . |
| 3,186,604 | 6/1965 | Pentesco .................................. 222/501 |
| 3,285,474 | 11/1966 | Gran . |
| 3,407,977 | 10/1968 | Ruggeri .................................... 222/554 |
| 5,192,004 | 3/1993 | Burrows . |
| 5,395,014 | 3/1995 | Burrows . |

*Primary Examiner*—Steven O. Douglas

[57] ABSTRACT

A reservoir and faucet assembly for a water cooler includes at least one faucet fitting for removable mounting of a faucet, wherein the faucet fitting has a check valve mounted therein to prevent water spillage when the faucet is removed. The check valve is adapted to be opened when the faucet is installed within the faucet fitting and to close when the faucet is removed from the reservoir. With this design, the faucet can be disassembled from the reservoir, without first requiring drainage of water from the reservoir.

7 Claims, 7 Drawing Sheets

ABSTRACT# RESERVOIR AND FAUCET ASSEMBLY FOR A WATER COOLER

BACKGROUND OF THE INVENTION

This invention relates generally to improvements in water coolers of the type adapted to receive and support a water bottle in an inverted position over a cooler reservoir, and to selectively dispense water from the reservoir. More particularly, this invention relates to an improved reservoir and realted faucet assembly designed for periodic reservoir removal from the water cooler to permit reservoir cleaning, wherein the reservoir is equipped with a check valve which prevents water spillage upon disassembly of a faucet preparatory to removal of the reservoir from the cooler.

Bottled water coolers in general are well-known in the art for containing a supply of relatively purified water in a convenient manner and location ready for substantially immediate dispensing and use. Such bottled water coolers commonly include an upwardly open reservoir mounted within a cooler housing adapted to receive and support an inverted water bottle of typically three to five gallon capacity. The water within the bottle flows downwardly into the reservoir for selective dispensing therefrom through a faucet valve located in an accessible position on the front of the cooler housing. Such bottled water coolers are widely used to provide a clean and safe source of water for drinking and cooking, especially in areas where the local water supply is suspected to contain undesired levels of contaminants.

In many bottled water coolers, a refrigeration system is mounted within the cooler housing and includes a chiller coil or probe for maintaining water within the reservoir in a chilled condition. In other configurations, the reservoir is subdivided into distinct chambers, one of which is associated with the refrigeration system, whereas another chamber contains unrefrigerated water substantially at room temperature. In some cases, an additional chamber is provided in association with a heating element to provide a supply of hot water. In bottled water coolers of the multichamber type, separate dispenser faucets are provided in flow communication with the respective water chambers to permit separate dispensing of the water at the different temperatures.

In recent years, it has been recognized that there is a periodic need to clean the reservoir of a bottled water cooler. In this regard, bottled water coolers have been developed to permit relatively quick and easy reservoir removal from the cooler housing for cleaning purposes. Reservoir removal is normally accomplished by removing the faucet or faucets which are mounted on the reservoir and protrude from the front of the cooler housing, followed by sliding lift-out removal of the reservoir from the cooler housing. However, since the faucets are normally installed within faucet fittings located near the bottom of the reservoir, faucet removal will be accompanied by water spillage unless the reservoir is first drained of water.

The present invention provides an improved removable reservoir for a bottled water cooler, wherein each faucet fitting is equipped with a check valve that closes when the associated faucet is removed and thereby prevents water spillage from the reservoir through the faucet fitting. The faucet or faucets can thus be removed from the reservoir without requiring drainage of water therefrom, so that the reservoir can be removed for cleaning.

SUMMARY OF THE INVENTION

In accordance with invention, an improved reservoir is provided for use in a water cooler, wherein the reservoir has one or more faucet fittings each including a check valve mounted therein. The check valve is designed to be opened as an incident to mounting of the associated faucet on the reservoir, or otherwise to be opened upon operation of the associated faucet. When the faucet is removed from the reservoir, the check valve closes to prevent water spillage from the reservoir. Accordingly, each faucet can be removed from the reservoir to permit reservoir removal from the cooler housing for cleaning, without first requiring the reservoir to be drained.

In one preferred form, the reservoir includes at least one faucet fitting near the bottom thereof in a position for alignment with a faucet port formed in a front wall of the cooler housing when the reservoir is installed in the cooler housing. A poppet style spring-loaded check valve is installed within the faucet fitting and is normally biased to a closed position to prevent water flow therethrough. The check valve is opened by engagement with the faucet, when said faucet is installed into the faucet fitting. In one form, the faucet includes a stem portion that engages and opens the check valve in the course of faucet installation. In another form, the faucet includes an actuator pin operated by a pushbutton to open the check valve when it is desired to dispense water from the reservoir.

The faucet may be provided with a standard threaded stem portion for thread-in mounting within and thread-out removal from the faucet fitting on the reservoir. Alternately, the faucet and reservoir fitting can be provided with bayonet lugs for quick and easy installation by a push-in and turning motion through a one-fourth or quarter turn, or similar part-circular motion. In a quarter turn design, the check valve can be formed as a poppet style check valve as previously described, or as a rotatable valve plug adapted to be engaged by the faucet stem portion during faucet installation and then rotated to an open position as the faucet is rotated to the installed position. Conversely, when a rotatable check valve plug is used, faucet removal is accompanied by return rotation of the check valve plug to a closed position.

With a bayonet style faucet, multiple faucet fittings on a removable reservoir for use in a bottled water cooler for dispensing water at different temperatures can be equipped with appropriate bayonet lugs at different angular positions to insure installation of the correct faucet within the correct faucet fitting. That is, the faucets are normally coded as by colored indicia to indicate the temperature of the water to be dispensed from that faucet. The bayonet lugs on the various faucet fittings, and on the associated faucets, can be formed at appropriate and different angular positions, so that installation of the wrong faucet within a faucet fitting will result in the faucet being incorrectly oriented relative to the front of the cooler housing.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figures 1, 2, 3:
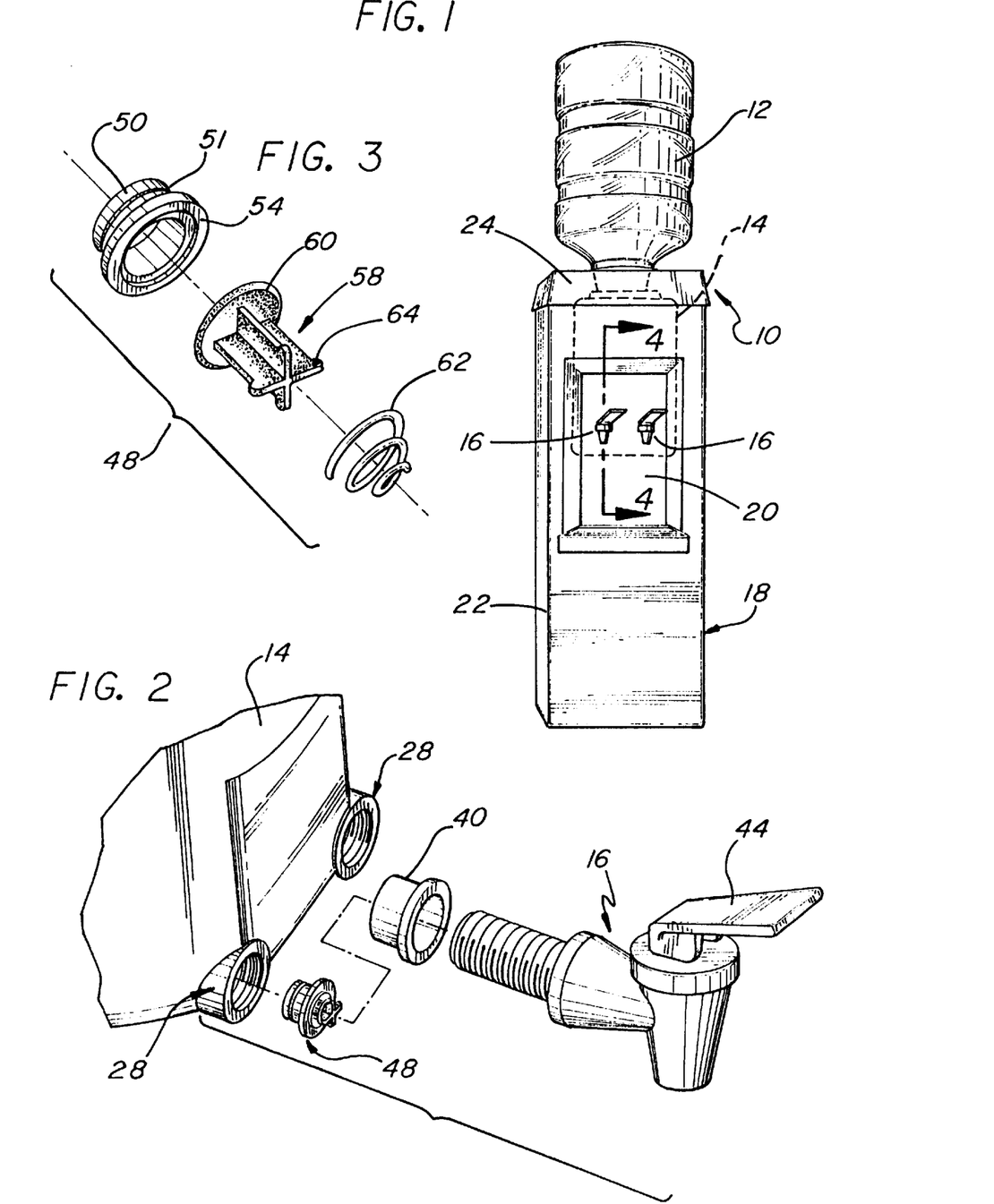
FIG. 1 is a perspective view illustrating a bottled water cooler equipped with the improved removable reservoir of the present invention.
FIG. 2 is an enlarged and exploded fragmented perspective view showing a check valve in association with the removable reservoir and a faucet for installation onto the reservoir.
FIG. 3 is an exploded perspective view of the components of the check valve shown in FIG. 2.

As shown in the exemplary drawings, a bottled water cooler referred to generally by the reference numeral 10 in FIG. 1 is provided for receiving and supporting a water bottle 12 containing a supply of relatively purified water for drinking and cooking, etc. The bottled water cooler 10 includes a reservoir 14 for receiving and storing water flowing downwardly from the water bottle 12, in combination with a refrigeration system (not shown) for chilling water within a portion of the reservoir. FIG. 1 shows a pair of faucets 16 on the front of a cooler housing 18 to permit water to be dispensed from the reservoir for use. In accordance with the invention, check valves (not shown in FIG. 1) are associated with each faucet 16 to facilitate periodic removal of the reservoir 14 from the cooler housing 18 for cleaning.

The illustrative bottled water cooler 10 has a generally conventional overall size and shape to include the cabinet or housing 18 shown with a generally rectangular configuration having a front wall 20 joined to a pair of housing side walls 22 and a housing back which typically has an open construction. The refrigeration system is normally mounted within a lower region of the housing interior and includes a chiller coil or probe (not shown) in close heat transfer relation with a portion of the reservoir 14. In this regard, the reservoir 14 is supported within an upper region of the housing interior in a position to receive the neck and mouth of the inverted water bottle 12 which is typically supported on a lid or cover 24 at the top of the cooler housing 18. A portion of the reservoir 14 is seated within an insulated receptacle 26 (FIGS. 4–5), and the faucets 16 are adapted to extend through open ports formed in the housing front wall 20 and the insulated receptacle 26 for connection to the reservoir 14 by means of faucets fittings 28.

In the illustrative drawings, a pair of faucets 16 are shown connected to the reservoir for dispensing water from different portions of the reservoir interior. In this regard, the refrigeration system is normally associated with one portion of the reservoir interior to chill water therein, while another portion of the reservoir contains water at a different temperature such as room temperature. A baffle plate (not shown) is commonly provided to subdivide the reservoir interior into two substantially separated chambers, adapted for separate flow connection to the pair of faucets 16, all in a manner known in the art. A further description of the construction and operation of a bottled water cooler having a subdivided reservoir and separate faucets for dispensing water at different temperatures is found in commonly assigned U.S. Pat. Nos. 5,192,004 and 5,395,014, which are incorporated by reference herein.

Figure 4:
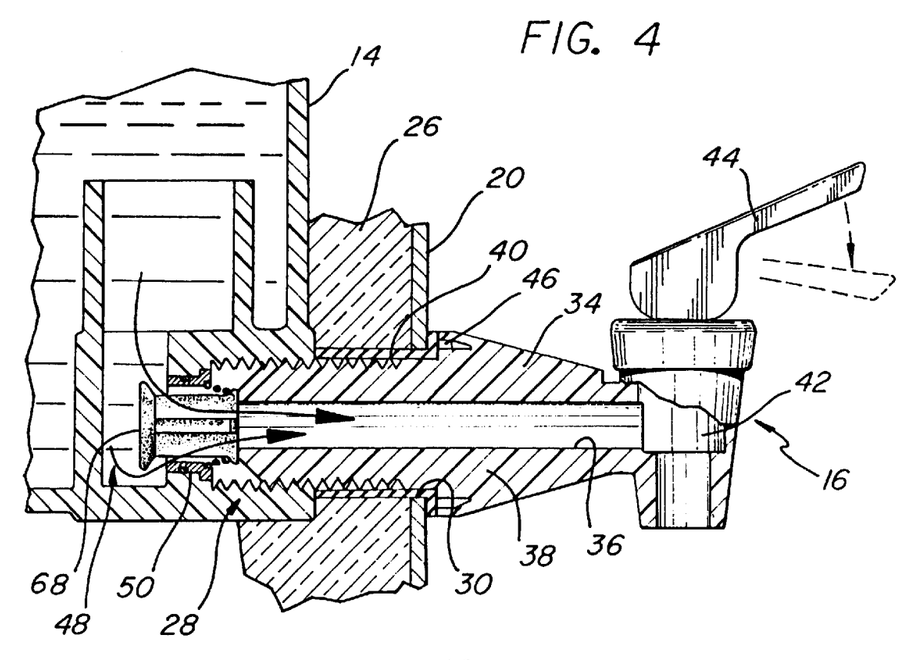
FIG. 4 is an enlarged fragmented vertical sectional view taken generally on the line 4—4 of FIG. 1.
Figure 5:
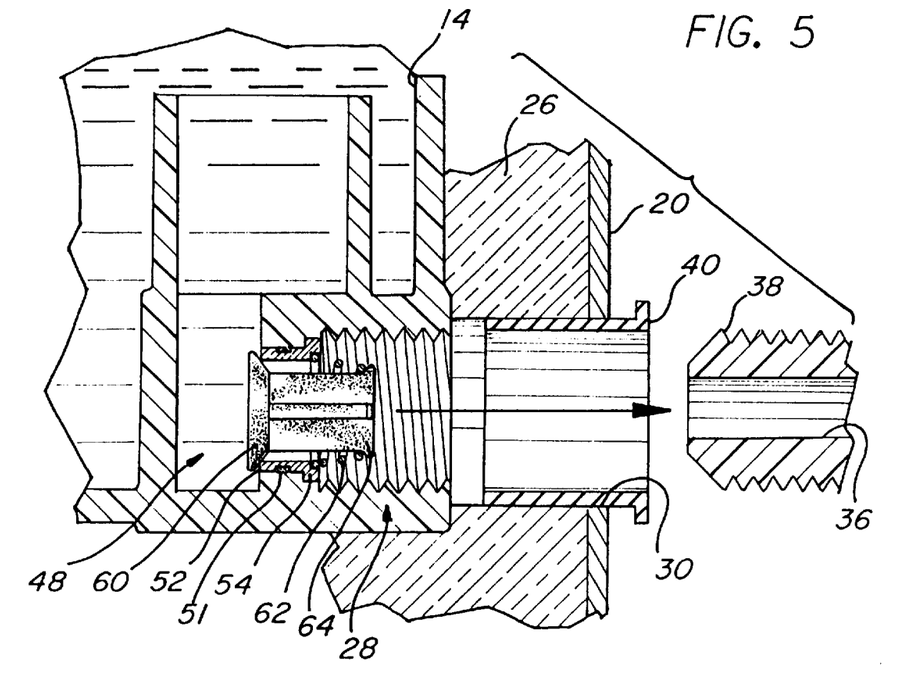
FIG. 5 is an enlarged and exploded fragmented vertical sectional view similar to FIG. 4, and showing the faucet removed from the reservoir.

The reservoir 14 is formed from molded plastic or the like and is designed for slide-in installation into the cooler housing 18, and for slide-out removal therefrom when desired for cleaning. The faucet fittings 28 are formed on a front wall or front portion of the reservoir, at or near a bottom wall thereof as shown in FIGS. 2, 4 and 5. In the embodiment shown, the faucet fittings are internally threaded for quick and easy thread-in connection to the associated pair of faucets 16. When the reservoir 14 is seated within the cooler housing 18, the faucet fittings 28 are generally aligned with the open ports 30 (FIGS. 4 and 5) formed in the insulated receptacle 26 and in the front wall 20 of the cooler housing 18.

Each faucet 16 includes a body 34 (FIG. 4) defining an internal flow passage 36 through which water can be dispensed from the reservoir 14. A rear portion of the faucet body is formed as a stem portion 38 with external threads for thread-in connection to the associated faucet fitting 28. In this regard, the threaded stem portion is sized to fit through the housing port 30 for thread-in connection to the reservoir, with a seal bushing 40 carried about the stem portion and compressed between the faucet and reservoir to prevent water leakage. A valve member 42 is mounted near the front of the faucet body and is manually operated by a lever handle 44 or the like to open and close the flow passage 36 to water flow. A central portion of the valve body 34 may be formed with an annular air gap 46 to minimize or eliminate condensation of the faucet exterior, as described in U.S. Pat. No. 5,395,014.

In accordance with the invention, a check valve 48 is mounted within each faucet fitting 28 and functions to prevent water flow through the faucet fitting whenever the associated faucet 16 is removed from the reservoir. The check valve 48 thus permits quick and easy reservoir removal for cleaning or the like, without requiring the exercise of great care and caution to first drain the water from the reservoir. In addition, the check valve 48 beneficially safeguards against water loss from the reservoir 14 in the event that the faucet is removed from the reservoir by vandals.

FIGS. 2–5 show the check valve 48 in the form of a compact cartridge having an outer annular cartridge housing 50 sized to seat within a stepped bore 52 at the inboard end of the threaded faucet fitting 28. An enlarged flange 54 of the cartridge housing 50 seats against a shoulder of the stepped bore 52 to retain the cartridge in place, and a seal ring 51 carried about the housing 50 engages the interior of the faucet fitting 28 to prevent leakage. A valve piston 58 has an enlarged valve head 60 for engaging and closing a valve seat at an inboard end of the cartridge housing. The valve head 60 is normally retained against the valve seat by a spring 62 reacting between the cartridge housing 50 and a rib 64 located at a front or outboard end of the valve piston 58.

The valve piston 58 protrudes in a forward or outboard direction a short distance beyond the cartridge housing 50, so that the valve piston 58 is engaged and depressed by the stem portion of the associated faucet 16, when the faucet is installed into the faucet fitting 28. Such faucet installation is shown in FIGS. 2, 4 and 5, and results in depression of the valve piston 58 against the spring 62 to open the valve head 60 relative to the valve seat. Accordingly, the check valve 48 prevents water flow from the faucet fitting 28 until the faucet 16 is installed, at which time the check valve 48 is opened to permit water flow in response to normal operation of the standard faucet lever 44. However, when the faucet 16 is removed from the reservoir, as shown in FIG. 5, the check valve 48 is again reclosed as the spring 62 returns the valve head 60 to the closed position.

FIGS. 6–12 show an alternative embodiment of the invention wherein a modified check valve 148 is provided in combination with a modified faucet 116 adapted for quick and easy installation onto a reservoir 114 with a part-circular and preferably quarter-turn rotational motion. The check valve 148 comprises a rotatable plug body 158 that is engaged and rotated by the faucet 116 for movement to an open position as an incident to faucet installation. Conversely, with the faucet 116 is removed from the reservoir, the rotatable plug body is returned to a closed position.

More specifically, the reservoir 114 shown in FIGS. 6 and 8–12 is identical to the reservoir 14 previously described herein, except that a modified faucet fitting 128 includes a pair of internal bayonet style lugs 66 in lieu of an internal threaded geometry. A pair of such modified faucet fittings 128 are provided for mounting of a corresponding pair of faucets 116 used to dispense water at two different temperatures, as previously described. In this embodiment, however, the bayonet lugs 66 within the two faucet fittings 128 are oriented at different angular positions, preferably ninety degrees out of phase to each other, to insure installation of the correct faucet into the proper faucet fitting as will be described in more detail.

Figures 9, 10:
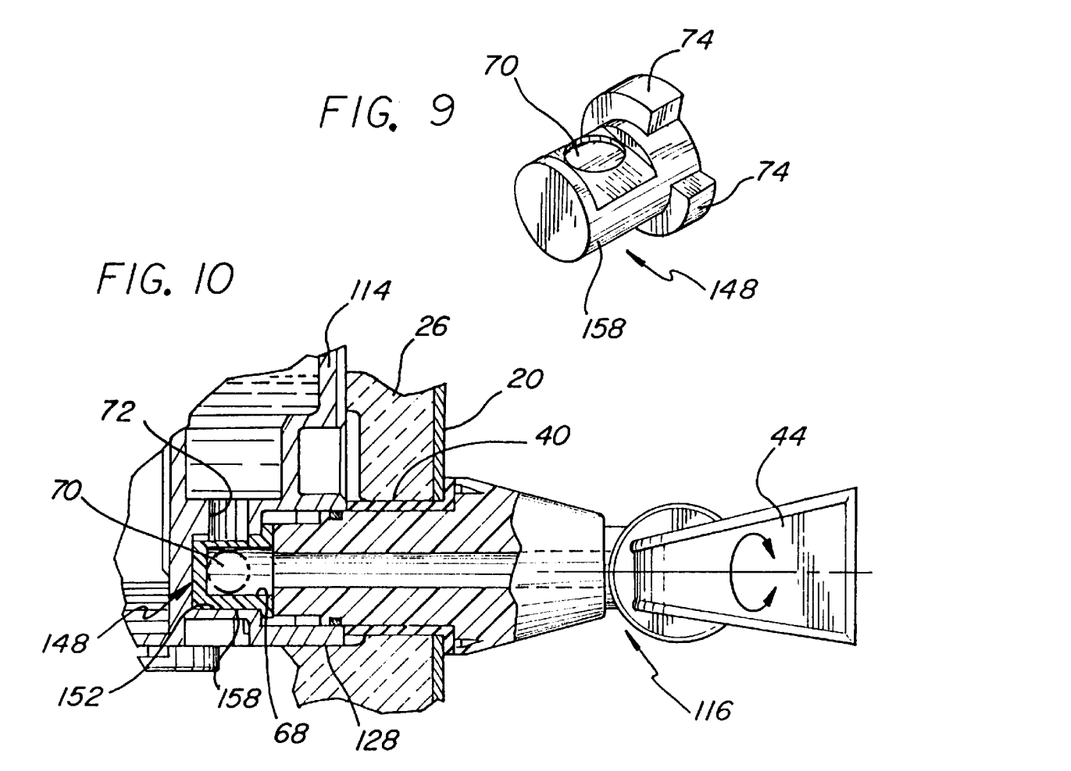
FIG. 9 is a rear perspective view of the check valve shown in FIG. 6.
FIG. 10 is an enlarged and fragmented vertical sectional view taken generally on the line 10—10 of FIG. 7.
Figure 11:
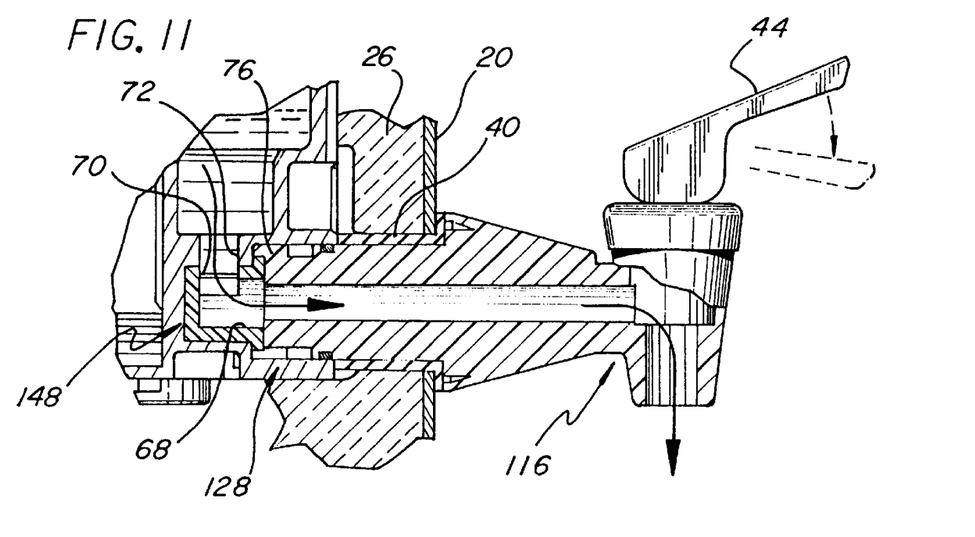
FIG. 11 is an enlarged and fragmented vertical sectional view taken generally on the 11—11 of FIG. 8.

The check valve 148 for each faucet fitting 128 comprises the rotatable plug body 158 having a flow passage 68 formed therein. The plug body 158 has a size and shape to fit within a cylindrical bore 152 formed in the faucet fitting 128 and for rotation therein to selectively align a radial inlet 70 with a flow port 72 which opens to the interior of the reservoir 114. Appropriate rotation of the plug body 158 within the faucet fitting 128 is effective to align the radial inlet 70 with the flow port 72 to permit water outflow from the reservoir (FIG. 11), or to position the radial inlet 70 out of alignment with the flow port 72 to prevent water outflow from the reservoir (FIG. 10). A pair of radially enlarged ears 74 are provided on a front or outboard end of the plug body 158 to fit past the bayonet lugs 66 on the faucet fitting 128 upon insertion of the check valve into the fitting. Subsequent rotation of the check valve within the fitting rotates the ears 74 to a position behind the bayonet lugs 66, resulting in retention of the check valve 148 within the faucet fitting.

Each faucet 116 is also modified from the style described in FIGS. 1–5 to include a stem portion equipped with bayonet lugs 76 adapted for mating and releasible locking engagement with the bayonet lugs 66 of the associated faucet fitting 128. Accordingly, each faucet 116 is adapted for push-in reception into the associated faucet fitting 128 to displace the faucet lugs 76 axially past the fitting lugs 66, followed by part-circular rotation through about ninety degrees to position the faucet lugs 76 axially behind the fitting lugs 66. The bayonet lugs 76 on the faucets 116 include axially forwardly projecting end walls 78 (FIG. 6) to provide stops engaging the ends of the fitting lugs 66 upon full faucet installation. The opposite free ends of the faucet lugs 76 desirably include detent tabs 80 for snap-fit engagement with the fitting lugs 66, all in a manner well known with respect to bayonet-style connections.

Figure 12:
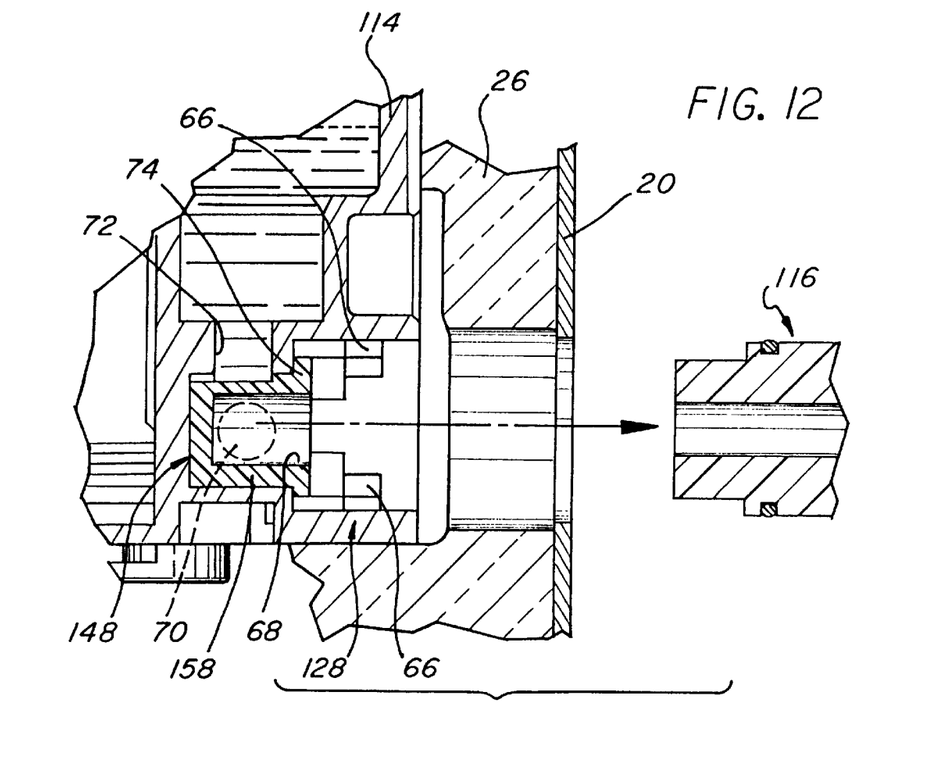
FIG. 12 is an exploded fragmented vertical sectional view similar to FIG. 11, but showing removal of the faucet from the reservoir.

Thus, each faucet 116 is installed quickly and easily into the associated faucet fitting 128 by means of a simple push-in and quarter-turn motion. During push-in movement of the faucet, the faucet lugs 76 fit circumferentially between the fitting ears 74 so that subsequent faucet rotation results in a corresponding rotation of the check valve 148 through the same quarter-turn motion. With this construction, the installation of the faucet 116 is accompanied by movement of the check valve 148 from the closed position shown in FIG. 10 to the open position shown in FIG. 11. In addition, a seal gasket 40 identical to that previously described is carried about the faucet stem portion and is axially compressed between the faucet and the reservoir as the faucet is installed. Importantly, in this embodiment, the seal gasket 40 is subjected to the same degree of compression each time the faucet is installed, thereby insuring a uniform and sufficient gasket compression for a watertight seal. Subsequent rotation of the faucet 116 for removal from the faucet fitting 128, as shown in FIG. 12, first returns the check valve 148 to the closed position before the faucet lugs 76 are rotated clear of the fitting lugs 66 to permit slide-out removal of the faucet form the reservoir.

Figure 6:
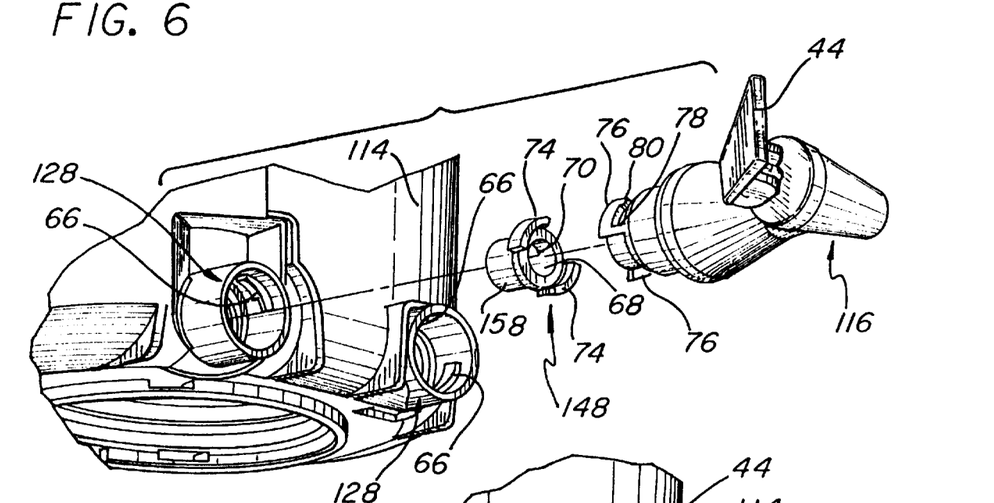
FIG. 6 is an enlarged and exploded perspective view showing an alternative embodiment of the invention, with a check valve in association with a removable reservoir and faucet for mounting onto the reservoir.
Figure 7:
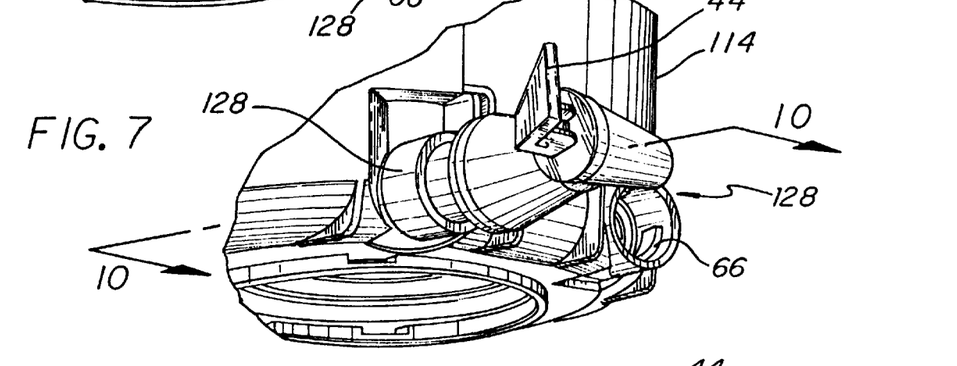
FIG. 7 is a perspective view similar to FIG. 6, but illustrating initial engagement of the faucet with the reservoir for installation.
Figure 8:
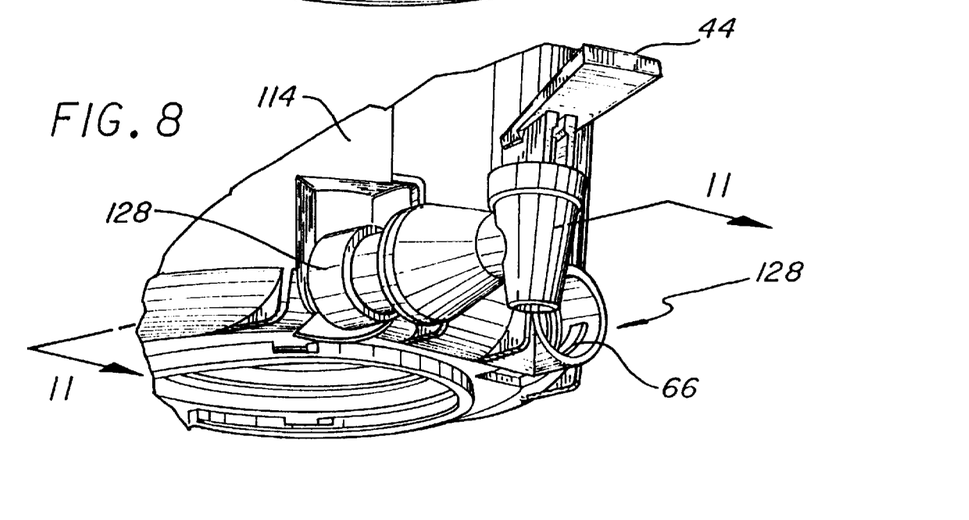
FIG. 8 is a perspective view similar to FIG. 7, but depicting the faucet in a final installed position on the reservoir.

The faucets 116 associated with dispensing of water at different temperatures are normally coded to indicate the temperature of the water to be dispensed therefrom, with a typical code provided by the color of the lever handle 44. For example, in many bottled water coolers available on the market, the lever handle 44 associated with chilled water is colored blue, whereas the lever handle 44 associated with room temperature water is colored white. By forming the bayonet lugs 66 within the faucet fittings 128 at different angular positions, and by correspondingly forming the faucet lugs 76 on the faucets 116 at conforming angular positions; it is possible to insure that the correct faucet 116 is installed into the correct faucet fitting 128. That is, although the two faucets 116 can be installed in reverse, installation of the wrong faucet into the wrong faucet fitting will result in misorientation of the faucet relative to the housing 18 of the bottled water cooler 10. To obtain correct faucet orientation in an upright position, as depicted in FIGS. 6, 7 and 8, it is necessary to install the correct faucet into the correct fitting.

A further alternative preferred form on the invention is shown in FIGS. 13–17, wherein a check valve 48 of the type described in the embodiment of FIGS. 1–5 is installed into the faucet fitting 128 of a reservoir 114 as shown and described in FIGS. 6–12. In this version, a modified faucet 216 is provided in a pushbutton style. The faucet 216 is installed with a push-in and quarter-turn motion, but does not automatically open the check valve 48 during faucet installation. Instead, the faucet 216 has a pushbutton 82 for operating an actuator pin 84 to open the check valve whenever water dispensing is desired. When the pushbutton 82 is released, the check valve 48 recloses. The check valve 48 remains closed when the faucet 216 is removed from the reservoir.

More particularly, as shown in FIGS. 13–17, the modified faucet 216 has a faucet body 234 defining a rear stem portion with bayonet lugs 76 thereon for releasible mounting into the associated faucet fitting 128, as previously described with respect to FIGS. 6–12. The faucet body 234 has a flow passage 236 formed therein leading from the rear or inboard end thereof to an open downspout 86 at a front or outboard end. The actuator pin 84 is carried within the flow passage 236 and includes a narrow rear end disposed in close proximity with the check valve piston 58 when the faucet is installed. A forward end of the actuator pin 84 terminates in an enlarged X-shaped head 88 at the inboard side of a resilient diaphragm 90 mounted on the faucet body 234. The pushbutton 82 is in turn carried by the diaphragm 90 for reciprocal motion through a short stroke sufficient to cause the actuator pin 84 to engage and open the check valve 48 to dispense water through the spout 86. Release of the pushbutton 82 is accompanied by return movement of the valve and actuator pin 84 to an initial closed position, under the influence of the spring 62.

Use of the pushbutton style faucets 216 as shown in FIGS. 13–17 beneficially confines water to within the reservoir 114 when the faucet is closed. That is, there is no residual water within the faucet flow passage 236 when the faucet is closed. With chilled water, this construction effectively prevents undesirable condensation on the exterior of the faucet. Seal gaskets 40 of the type shown in FIGS. 1–12 may also be used but are not shown in FIGS. 13–17. A seal ring 85 is shown on the stem portion of each faucet 216 for engagement with the associated faucet fitting 128, and this seal ring 85 can be used in combination with a seal gasket 40, if desired.

Figure 13:
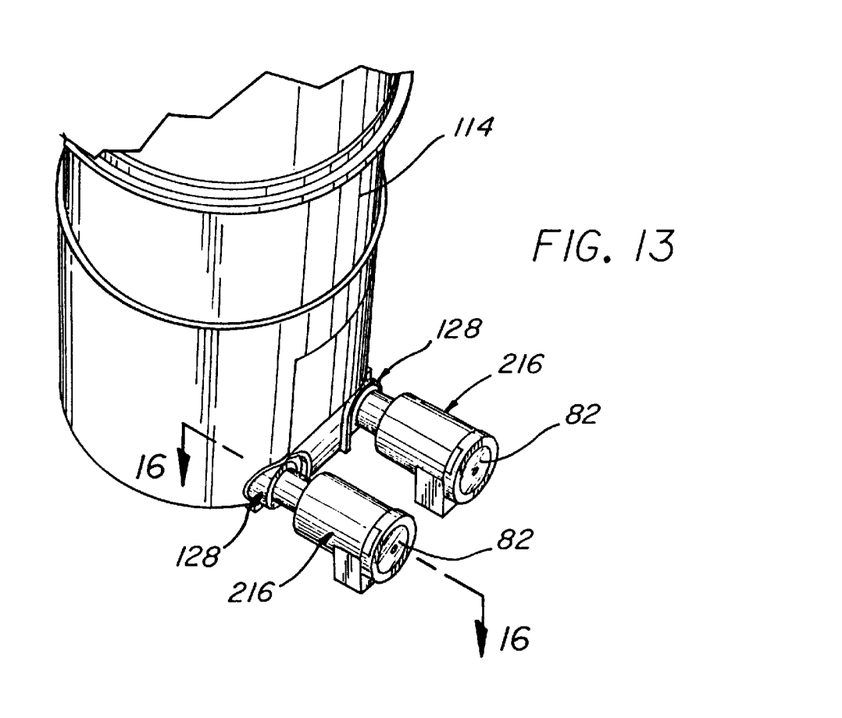
FIG. 13 is a fragmented perspective view depicting a further alternative preferred form of the invention.
Figure 14:
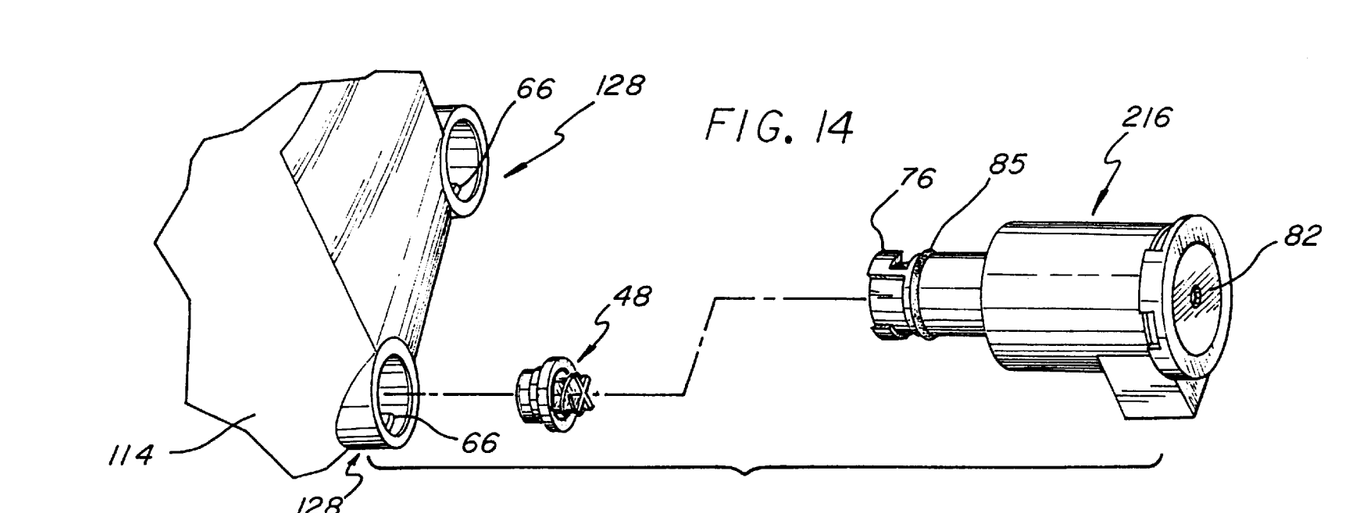
FIG. 14 is an exploded perspective view of the embodiment of FIG. 13, showing a check valve in association with a removable reservoir and faucet for mounting onto the reservoir.
Figure 15:
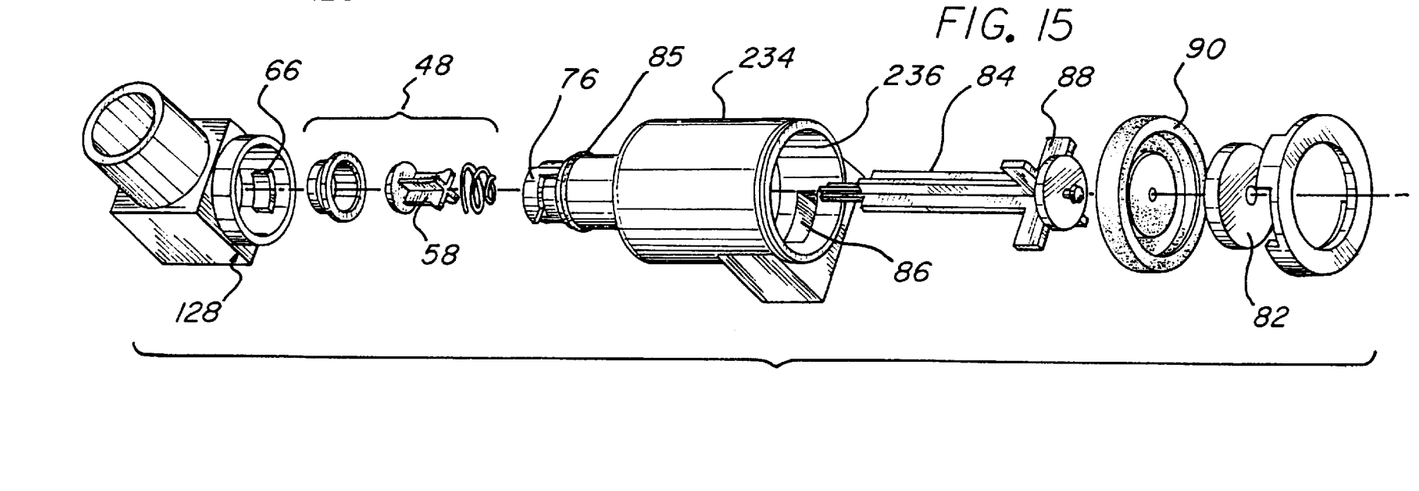
FIG. 15 is a further exploded perspective view of the components shown in FIG. 14.
Figure 16:
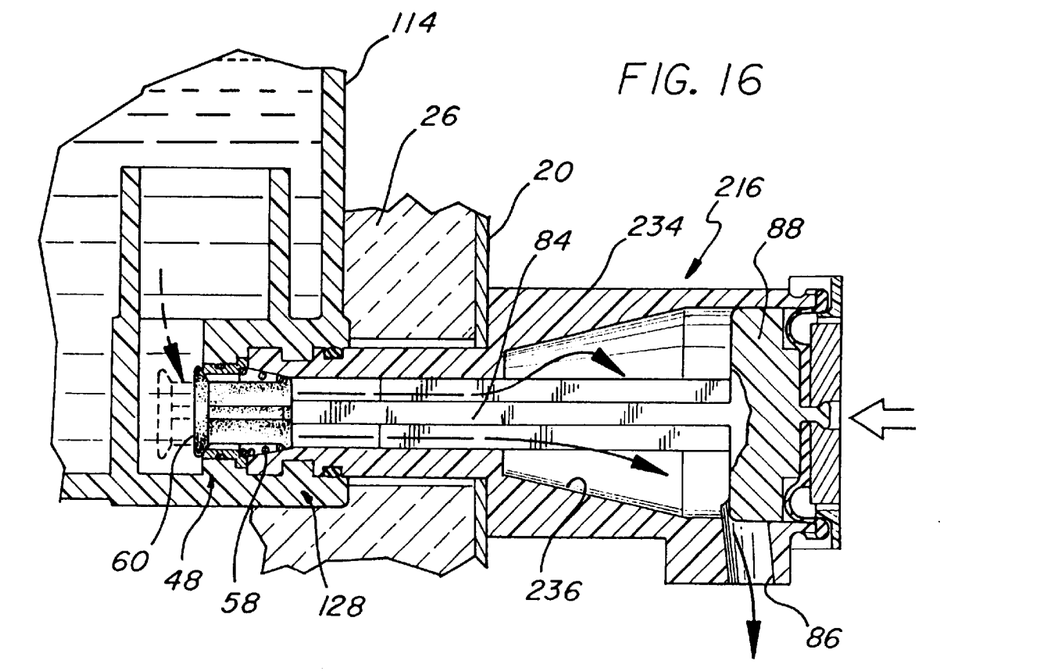
FIG. 16 is an enlarged fragmented vertical sectional view taken generally on the line 16—16 of FIG. 13.
Figure 17:
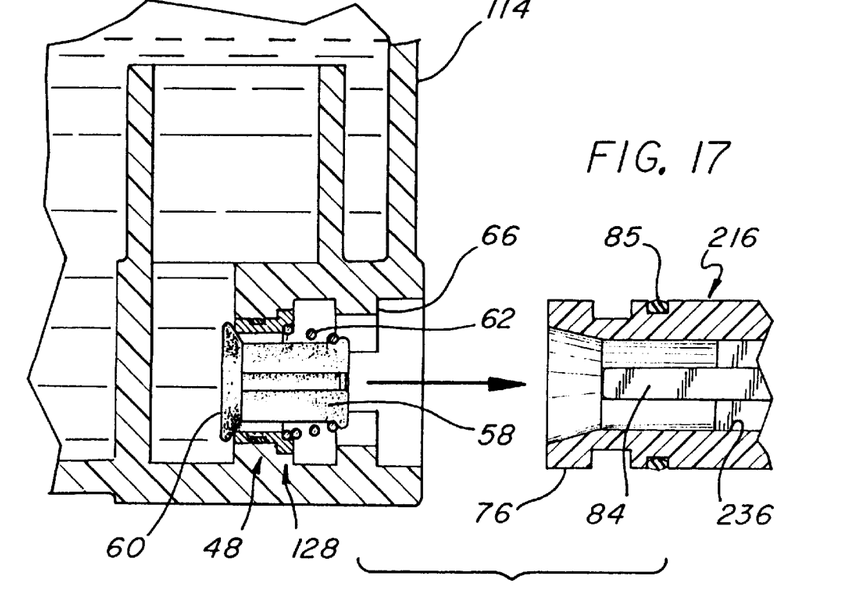
FIG. 17 is a fragmented vertical sectional view similar to FIG. 16, but depicting removal of the faucet from the reservoir.

The pushbutton type faucet 216 of FIGS. 13–17 is also desirably color-coded to indicate the temperature of water to be dispensed. Accordingly, the bayonet lugs 66 on the faucet fittings 128 as well as the bayonet lugs 76 on the two faucets 216 shown in FIGS. 13 and 14 are formed at different angular positions to insure installation of the correct faucet into the correct fitting. It will be understood, however, that the pushbutton style faucets may be adapted for thread-in mounting into the faucets fittings as shown in FIGS. 1–5. Similarly, the bayonet style faucets shown in FIGS. 6–12 can be used with the poppet style check valve, wherein the faucet stem portion engages and opens the check valve upon insertion of the faucet into the faucet fitting.

In each of the various embodiments of the invention, each faucet is removably mounted to the reservoir in a manner permitting faucet removal preparatory to removal of the reservoir from the cooler housing for cleaning purposes. A check valve is associated with each faucet, and is closed when the related faucet is removed from the reservoir. Thus, water will not spill from the reservoir through the faucet fitting when the faucet is removed.

A variety of further modifications and improvements to the invention will be apparent to those skilled in the art. Accordingly, no limitation on the invention is intended by way of the foregoing description and accompanying drawings, except as set forth in the appended claims.

What is claimed is:

1. A reservoir for use in a water cooler, said reservoir comprising:
    a reservoir member having a hollow interior for receiving and storing a supply of water;
    at least one faucet fitting on said reservoir member for removable mounting of a faucet; and
    a check valve mounted on said reservoir member at a position generally in association with said faucet fitting, said check valve preventing water outflow from said reservoir member through said faucet fitting when said faucet fitting is unconnected to a faucet;

said check valve comprising a rotatable valve member mounted within said faucet fitting for rotation between an open position and a closed position, said valve member being positioned to be engaged and opened by a faucet upon mounting of the faucet to said faucet fitting, and to be engaged and closed by the faucet upon removal of the faucet from said faucet fitting.

2. A reservoir assembly for use in a water cooler, said reservoir assembly comprising:
    a reservoir having a hollow interior for receiving and storing a supply of water;
    a faucet fitting on said reservoir, said faucet fitting defining a flow path for dispensing of water from said reservoir;
    a faucet for removable connection to said faucet fitting, said faucet including a faucet valve operable to dispense water from said reservoir; and
    a check valve mounted in association with said faucet fitting and including a rotatable valve member for normally preventing water dispensing through said flow path, said valve member being engageable by said faucet and rotatable thereby to an open position permitting water dispensing through said flow path, said valve member being rotatably returned to a closed position preventing water dispensing through said flow path when said faucet is removed from said faucet fitting.

3. The reservoir assembly of claim 2 wherein said faucet fitting and said faucet include interengageable bayonet lugs for push-in and part-turn connection of said faucet to said faucet fitting.

4. The reservoir assembly of claim 3 wherein said reservoir has at least two faucet fittings formed thereon with said bayonet lugs at different angular positions, and further including a corresponding numbers of faucets each formed with bayonet lugs at angular positions conforming with a respective one of said faucet fittings.

5. The reservoir assembly of claim 2 further including a seal member compressed between said faucet and said faucet fitting when said faucet is connected to said faucet fitting.

6. A reservoir assembly for use in a water cooler, said reservoir assembly comprising:
    a reservoir having a hollow interior for receiving and storing a supply of water;
    at least two faucet fittings on said reservoir, each of said faucet fittings defining a flow path for dispensing of water from said reservoir; and
    a plurality of faucets corresponding in number to the number of said faucet fittings, each of said faucets being for removable connection to a respective one of said faucet fittings and including a faucet valve operable to dispense water from said reservoir;
    said faucets and said faucet fittings including interengageable bayonet lugs for push-in and part-turn connection of said faucets respectively to said faucet fittings, said faucet fittings having said bayonet lugs formed thereon at different angular positions, and said faucets having said bayonet lugs formed thereon at angular positions conforming with a respective one of said faucet fittings.

7. The reservoir assembly of claim 6 wherein each of said faucet fittings further includes a check valve mounted therein for normally preventing water dispensing therethrough, said check valve being engageable by a respective one of said faucets for movement to an open position permitting water dispensing through said faucet fitting.

* * * * *

UNITED STATES PATENT AND TRADEMARK OFFICE
CERTIFICATE OF CORRECTION

PATENT NO. : 5,927,557
DATED : July 27, 1999
INVENTOR(S) : Louis M. Busick et al.

It is certified that error appears in the above-identified patent and that said Letters Patent is hereby corrected as shown below:

<u>Title page,</u>
Item [63], insert the following new section:
-- Related U.S. Application Data
Division of U.S. Application No. 08/661,747, filed June 11, 1996, now abandoned. --

<u>Column 1,</u>
Line 5, after the heading "BACKGROUND OF THE INVENTION", insert the following new paragraph:
-- This is a division of U.S. Serial No. 08/661,747, filed June 11, 1996, now abandoned. --

Signed and Sealed this

Tenth Day of February, 2004

JON W. DUDAS
*Acting Director of the United States Patent and Trademark Office*